United States Patent [19]

Andersson

[11] 4,138,030
[45] Feb. 6, 1979

[54] PRESSURE VESSEL JOINT

[75] Inventor: Gustav S. Andersson, Stockholm, Sweden

[73] Assignee: Aktiebolaget Atomenergi, Stockholm, Sweden

[21] Appl. No.: 885,325

[22] Filed: Mar. 10, 1978

[30] Foreign Application Priority Data

Apr. 13, 1977 [SE] Sweden .............................. 7704249

[51] Int. Cl.² .................... F16J 13/06; F16J 15/14; B65D 51/00
[52] U.S. Cl. ...................................... 220/3; 220/327; 277/27; 277/71; 277/112
[58] Field of Search ................ 277/3, 27, 70, 71, 102, 277/112; 220/3, 327

[56] References Cited

U.S. PATENT DOCUMENTS

| 2,816,679 | 12/1957 | Tinker | 220/327 X |
| 3,568,379 | 3/1971 | Johnsson et al. | 220/3 X |
| 3,653,434 | 4/1972 | Andersson | 220/3 X |

FOREIGN PATENT DOCUMENTS

| 503442 | 7/1930 | Fed. Rep. of Germany | 220/3 |
| 1525916 | 9/1969 | Fed. Rep. of Germany | 220/327 |
| 591217 | 4/1959 | Italy | 220/3 |
| 372772 | 5/1932 | United Kingdom | 220/327 |

Primary Examiner—Robert S. Ward, Jr.
Attorney, Agent, or Firm—Burns, Doane, Swecker and Mathis

[57] ABSTRACT

There is provided a joint between a pressure vessel lid and a pressure vessel. The vessel is intended for very high pressures and of the type comprising a thinwalled container which is supported by an external rigid support structure, such that the container provides the vessel tightness and the structure provides the vessel strength. The lid is clamped onto a container rim by means of screws via blocks. An annular shoulder is fixed to the support structure above the container rim. There is an axial play between the blocks and the shoulder. This play is adapted to be eliminated for a relatively low container pressurization at which the yield limit of the container material is reached. The screws merely have to provide the clamping force required to ensure the vessel tightness until the blocks abut the shoulder, whereafter a further container pressurization provides the necessary lid clamping force.

5 Claims, 2 Drawing Figures

PRESSURE VESSEL JOINT

The invention refers to a joint between a pressure vessel lid and a pressure vessel which comprises a thinwalled container that is supported by an external support structure, said joint comprising an annular, radially inwardly directed flange which is fastened at the rim of the container, screws which are arranged to clamp the rim of the lid onto the flange, and a sealing gasket which is clamped between the lid and the flange.

The invention has special connection to a pressure vessel of the type comprising a framework constructed by elements, in which a relatively thinwalled container is arranged. The framework needs not be tight but should exhibit high strength. The tightness function of the vessel is provided by the container. The container should, however, have such a material thickness that is does not buckle if subpressure occurs in the vessel. Element built pressure vessels of this type have a very high degree of redundance and can be designed for very high pressure. In this connection it is also of importance to make it possible to provide the pressure vessel with a removable lid with gasket and screws which fulfil the same requirement.

An object of the invention is therefore to provide a lid joint for a pressure vessel of the described type, which joint is readily mountable and demountable and can be designed with relatively small dimensions.

The inventive object is attained at a joint of the preamble-wise mentioned type, by the distinguishing features that the support-structure on its inside above the container rim has a shoulder ring with a downwardly facing support surface, that a gap is arranged between the lid and the shoulder ring, that blocks are placed in the gap, the blocks having a detent for the upper edge of the lid, that the screws extend close to or through the blocks and clamp the lid via the blocks, onto the shoulder that in the non-pressurized condition of the vessel an axial play is arranged between the shoulder ring and the block side facing the shoulder ring, said play being adapted to be eliminated for a pressure vessel pressurization which brings about a container elongation substantially equal to the play, and that a lubricant is arranged between the support structure and at least part of the container, whereby the screws only need to stand the load referring to said pressure vessel pressurization and the load referring to a necessary comprimation of the gasket.

Special means may be arranged for introduction of lubricant, and a preferred such means comprises an axial bore through at least one of the screws and a bore which extends through the flange from the associated screw bore of the flange to the external periphery of the flange.

The container may consist of a material having higher heat elongation coefficient than the support structure. If then the pressure vessel is intended to be pressurized at elevated temperature (for example with a fluid of elevated temperature) the axial play should be adapted to be eliminated partly by the container's axial heat elongation relative to the support-structure at a predetermined temperature partly by the container's axial elongation at a predetermined pressurization.

The gasket is suitably in conventional manner located in a recess in the flange, and a projection from the lower side of the lid being intended to press against the gasket. In order to prevent a too fargoing compression of the gasket, a spacer may be integral with the upper side of the flange for contact with the lid.

The lid is preferably of substantially constant thickness and has a domed shape, the convex side of the lid being arranged towards the interior of the container.

In order that the lubricant in the best way possible be retained at the intended location, a sheet mantle is suitably arranged between the container mantle and the support structure.

In the following the invention will be described in form of an example with reference to the enclosed drawings.

Figure 1:
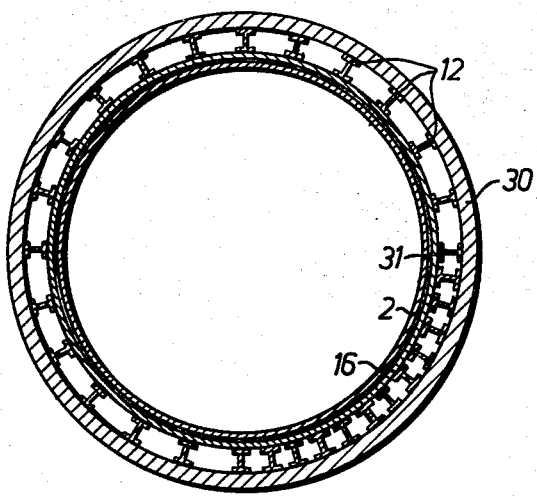
FIG. 1 illustrates schematically a radial section through a pressure vessel of the type for which the inventive joint is suitable.

In FIG. 1 there is illustrated a section through a cylindrical pressure vessel, which from the outside and inwardly comprises a plurality of circumferential reinforcement rings 30, a plurality of axially directed I-profile beams 12 which are supported by the rings 30, a sheet mantle 16 supported by the beams 12, a lubricant layer 31 and a thinwalled internal container 2.

Figure 2:
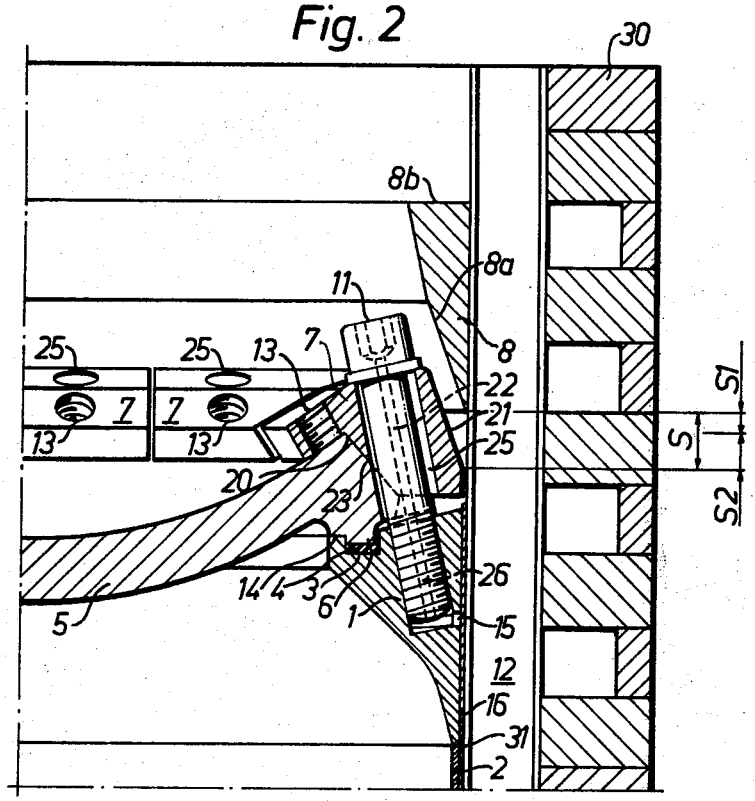
FIG. 2 illustrates a detailed partial section through the inventive joint.

In FIG. 2 there is shown a radially inwardly directed flange 1 fastened by welding at the upper edge of the container 2. The flange 1 supports a lid 5 which by means of screws 11 is held, via blocks 7, against the flange 1.

The flange 1 exhibits an upwardly facing recess 3 in which a gasket 4 is inserted. The lid 5 has at its lower side a circumferential projection 6 which is intended to press against the gasket 4. The flange 1 has an integral spacer 14 by means of which the penetration of the lid projection 6 into the recess 3 of the flange 1 is limited.

The block 7 is formed by a ring segment, which exhibits a recess 20 for the upper peripheral edge of the lid 5. The block has an aperture 25 for a screw 11 which is arranged for engagement with a threaded bore 26 in the flange 1. A shoulder ring 8 is arranged at the upper part of the beams 12, the shoulder ring having a support surface 8a which is intended to cooperate with the outer periphery surface 21 of the block 7. The surfaces 21 and 8a are substantially parallel. The shoulder ring 8 has an internal diameter which is larger than the external diameter of the lid 5, whereby the lid 5 readily can be lifted off and be set in place against the flange 1, respectively, when the blocks 7 and the screws 11 are removed.

FIG. 2 illustrates the joint's condition when the pressure vessel is unloaded and has room temperature. In this condition, there is an axial play S between the support-surface 8a of the support ring 8 and the support surface 21 of the block or wedge 7.

The play S is composed by two distances namely $S_1$ and $S_2$. The beams 12 may consist of carbon steel while the container 2 normally consists of stainless steel which has a higher coefficient of thermal expansion than carbon steel. If the pressure vessel is to be pressurized at an elevated temperature the container will, at the temperature elevation, expand the distance $S_2$ relative to the support structure (the beams 12).

At the pressurization of the vessel, the container 2 will be axially extended the distance $S_1$ under the influence of a pressure acting on the lid 5. When the thermal expansion of the container mantle relative to the beams 12 amounts to $S_2$ and the axial elongation of the container mantle 2 due to the pressurization of the vessel amounts to $S_1$, the surface 21 of the block 7 abuts the support surface 8a of the shoulder ring 8, whereby a continued pressurization of the vessel brings about that the pressure power acting against the lid 5 is transferred to the shoulder ring 8, while the tensile stress in the container mantle 2 in parallel with the beams 12 becomes substantially independent of the pressure.

It should be noted that the screws 11 merely have to be arranged to provide a clamping force that is sufficient to comprimate the gasket 4 in the necessary extent and to maintain the lid 5 at the flange 1 up to the pressure which brings about that axial elongation $S_1$ of the mantle at which the block 7 engages the support surface 8a.

The wedges 7 have threaded bores 13 into which bolts can be threaded in order to free the wedges 7, should they have got stuck at the lid 5 or some adjacent element.

The aperture 25 of the block 7 has preferably elongated shape in order to permit a relative movement between the screw 11 and the block 7 at the comprimation of the gasket 4.

The screw 11 has preferably an axial bore 22, and moreover a bore 15 extends from the bottom of the flange bore 26 out to the external periphery of the flange 1. Hereby a lubricant can readily be introduced between the flange 1 and the container mantle 2, respectively, and the sheet mantle 16 via the bores 22, 26 and 15. The sheet mantle 16 serves substantially to keep the lubricant in place.

If the pressure vessel is intended to be used at room temperature only, or the container plate 2 consists of a material having the same coefficient of thermal expansion as the beams 12, the play S can be made very small such that the screws 11 get a very small additional load at the pressurization, as the locking blocks 7 then already from the beginning lie very close to the supportsurface 8a of the support ring 8. In this case it it may be suitable to arrange the lid's peripheral edge 23 and the block's 7 corresponding abutment surface with an angle to the support surface 21 of the block 7, in order to simplify introduction and removal, respectively, of the blocks 7 into and from the gap between the lid 5 and the shoulder ring 8.

The lubricant 31 introduced between the container 2 and the sheet mantle 16 serves to prevent seizing between the container 2 and the sheet 16 (which is presupposed to have the same coefficient of thermal expansion as the beams 12) and thereby otherwise developing tensile stress in the weld joint between the flange 1 and the container 2.

It should be noted that the mantle 16 merely is a means to simplify retainment of the lubricant and that the mantle 16 could well be dispensed with. For example Molycote ® could be used as lubricant.

For a pressure vessel to be operated at room temperature, or in which the container 2 and the beams 12 have the same coefficient of thermal expansion, the following example can be given.

The container has a diameter of 256 mm, a length of 4000 mm, a wall thickness of 2 mm and consists of stainless pressure vessel steel (SIS 2333) having a yield limit of $2.4 \cdot 10^8$ N/m$^2$. At a container pressure of $3.8 \cdot 10^6$ N/m$^2$ the yield limit of the container material is reached. Thus, at this pressure the container should engage the beams 12 or the sheet 16 (if the yield limit raise due to elongation is neglected). The radial difference between pressurized and non-pressurized container is in this case about 0.15 mm, which means that the combination of support structure and container must be manufactured with a tolerance of less than 0.3 mm, counted on the diameter.

In the axial direction the yield limit of the container material is reached at a container pressure of $7.5 \cdot 10^6$ N/m$^2$. Thus, at this pressure, the blocks 7 should engage the shoulder ring 8 (if the yield limit raise due to the extension is neglected). The axial length difference between pressurized and non-pressurized container is in this case about 5 mm. By introducing a lubricant such as Molycote ® between the container and the support structure the container is permitted to slide relative to the support structure such that no significant forces develop due to friction.

The gasket 4 is constituted by a Beraflex ® -gasket which has the dimensions 213/193 × 5 mm and which for suitable function should be compressed to a thickness of 3.1–3.2 mm, which means a gasket pressure of $6 \cdot 10^7$ N/m$^2$.

The lid is held by 16 Unbrako ® screws M 14 which extend at an angle of 12° to the axis of the container. The screws can take a load of $8.6 \cdot 10^5$ N in the axis direction of the container. The force required to merely compress the gasket 4 amounts to $3.84 \cdot 10^5$ N. The lid is as mentioned subjected to the container pressure of $7.5 \cdot 10^6$ N/m$^2$ which can be assumed to act out to half the width of the gasket. The screw load referring to the container pressure then amounts to about $2.5 \cdot 10^5$ N. In order to have the gasket pressure remain unchanged at said container pressure, the screws must, thus, be able to take a force of $6.3 \cdot 10^5$ N. Thus, whith 16 Unbrako ® -screws M 14 a safety margin of about 35% is obtained.

The support ring 8 is preferably made with high stiffness in the axial direction in order to be able also to support blocks 7 which abut at "blind beams" that is beams which due to radial connection pieces to the container 2 are weakened or cut off and cannot take up any substantial axial force.

What is claimed is:

1. A joint between a pressure vessel lid (5) and a pressure vessel comprising a thin-walled container (2) which is supported by an external support structure (30, 12, 16), said joint comprising an annular flange (1) which is directed towards the container axis, and which is fastened at the rim of the inner container (2), screws which are arranged to clamp the rim of the lid (5) onto the flange (1), and a sealing gasket (4) between the flange (1) and the lid (5), characterized in that the support structure (30, 12, 16) which extends axially past the container rim on its inside beyond the container rim exhibits a support ring (8) with a support surface (8a) facing the interior of the container that a gap is present between the peripheral edge of the lid and the support surface (8a)

that blocks (7) are positioned in the gap, said blocks having a recess (20) for the upper edge of the lid (5)

that the screws (11) extend through the blocks (7) and clamp, via the blocks (7), the lid (5) against the flange (1), that in the unloaded condition of the pressure vessel, an axial play (S) is arranged between the support surface (8a) and that side of the blocks (7) facing the support surface (8a), said play (S) being adapted to be eliminated for a pressure vessel pressurization, which brings about a container elongation substantially equal to the play, and that a lubricant (16) is arranged between the support structure at least part of the surface of the container, whereby the screws (11) only need stand the load referring to said vessel pressurization and the load referring to required comprimation of the gasket.

2. A joint according to claim 1, characterized by means (22, 26, 15) for introduction of the lubricant.

3. A joint according to claim 2, characterized in that the means (22, 26, 15) for introduction of the lubricant comprises an axial bore (22) through one of said screws (11) and a bore (15) extending through the flange (1) from a threaded screw bore (26) for said one screw in the flange 1, to the support structure.

4. A joint according to claim 1, characterized in that the container (2) consists of a material, for example stainless steel, having higher coefficient of thermal expansion than the material, for example carbon steel, of the support structure, that the pressure vessel is intended to be pressurized at elevated temperature, and that the play (S) is adapted to be eliminated partly by the axial thermal expansion ($S_2$) of the container relative to the support structure at a predetermined temperature, partly by the axial expansion ($S_1$) of the container at a predetermined pressurization.

5. A joint according to claim 1, characterized in that the gasket (4) is located in a recess (3) in the flange (1) and that a projection (6) is arranged on the lower side of the lid to press against the gasket (4).

* * * * *